(12) United States Patent
Boldyrev et al.

(10) Patent No.: US 9,201,701 B2
(45) Date of Patent: Dec. 1, 2015

(54) METHOD AND APPARATUS FOR DISTRIBUTING COMPUTATION CLOSURES

(75) Inventors: Sergey Boldyrev, Söderkulla (FI); Seppo Juhani Pyhälammi, Helsinki (FI); Mika Juhani Mannermaa, Burlington, MA (US); Ian Justin Oliver, Söderkulla (FI); Ora Lassila, Hollis, NH (US); Corinne Dive-Reclus, St Albans (GB)

(73) Assignee: Nokia Technologies Oy, Espoo (FI)

( * ) Notice: Subject to any disclaimer, the term of this patent is extended or adjusted under 35 U.S.C. 154(b) by 460 days.

(21) Appl. No.: 13/108,571

(22) Filed: May 16, 2011

(65) Prior Publication Data

US 2012/0072917 A1    Mar. 22, 2012

Related U.S. Application Data

(60) Provisional application No. 61/365,093, filed on Jul. 16, 2010.

(51) Int. Cl.
   *G06F 9/46*    (2006.01)
   *G06F 9/50*    (2006.01)
   *H04L 29/08*   (2006.01)

(52) U.S. Cl.
   CPC ............ *G06F 9/5072* (2013.01); *G06F 9/5066* (2013.01); *H04L 67/10* (2013.01)

(58) Field of Classification Search
   None
   See application file for complete search history.

(56) References Cited

U.S. PATENT DOCUMENTS

| | | | |
|---|---|---|---|
| 7,543,302 B2 * | 6/2009 | Stanev et al. | 719/312 |
| 7,793,255 B1 * | 9/2010 | Kawaguchi et al. | 717/100 |
| 7,823,150 B2 * | 10/2010 | Grcevski et al. | 718/1 |
| 7,877,748 B2 * | 1/2011 | Kwiat et al. | 718/100 |
| 8,266,192 B2 * | 9/2012 | Nemoto et al. | 707/821 |
| 8,301,673 B2 * | 10/2012 | Hyer et al. | 707/822 |

(Continued)

FOREIGN PATENT DOCUMENTS

| | | |
|---|---|---|
| CN | 101350752 A | 1/2009 |
| CN | 102077526 A | 5/2011 |

(Continued)

OTHER PUBLICATIONS

Boldyrev, et al., "Network and Content Aware Information Management", International Conference for Internet Technology and Secured Transactions, 2009, (ICITST 2009), pp. 1-8, ISBN: 978-1-4244-5647-5, ieeexplore.ieee.org/xpl/freeabs_all.jsp?arnumber=5402569.

(Continued)

*Primary Examiner* — Tammy Lee
(74) *Attorney, Agent, or Firm* — Alston & Bird LLP

(57) ABSTRACT

An approach is provided for backend based computation closure oriented distributed computing. A computational processing support infrastructure receives a request for specifying one or more processes executing on a device for distribution over a computation space. The computational processing support infrastructure also causes, at least in part, serialization of the one or more processes as one or more closure primitives, the one or more closure primitives representing computation closures of the one or more processes. The computational processing support infrastructure further causes, at least in part, distribution of the one or more closure primitives over the computation space based, at least in part, on a cost function.

23 Claims, 10 Drawing Sheets

(56) References Cited

U.S. PATENT DOCUMENTS

| | | | |
|---|---|---|---|
| 8,495,636 B2 | 7/2013 | Bell, Jr. et al. | |
| 2005/0086656 A1* | 4/2005 | Whitlock et al. | 718/1 |
| 2005/0262512 A1* | 11/2005 | Schmidt et al. | 719/310 |
| 2006/0168585 A1* | 7/2006 | Grcevski et al. | 718/104 |
| 2006/0248199 A1* | 11/2006 | Stanev | 709/227 |
| 2007/0094214 A1 | 4/2007 | Li et al. | |
| 2007/0294692 A1 | 12/2007 | Zhao et al. | |
| 2008/0163188 A1* | 7/2008 | Siskind et al. | 717/168 |
| 2009/0022118 A1 | 1/2009 | Behzad et al. | |
| 2009/0031310 A1* | 1/2009 | Lev et al. | 718/101 |
| 2009/0109230 A1* | 4/2009 | Miller et al. | 345/506 |
| 2009/0165016 A1* | 6/2009 | Bell et al. | 718/107 |
| 2009/0281987 A1 | 11/2009 | Krishnamoorthy et al. | |
| 2009/0319645 A1 | 12/2009 | Boldyrev et al. | |
| 2010/0011370 A1* | 1/2010 | Kubo et al. | 718/104 |
| 2010/0031267 A1 | 2/2010 | Maessen et al. | |
| 2010/0241827 A1 | 9/2010 | Yu et al. | |

FOREIGN PATENT DOCUMENTS

| | | |
|---|---|---|
| EP | 2023675 A1 | 2/2009 |
| EP | 229191953 A | 3/2011 |
| GB | 2 454 497 A | 5/2009 |
| KR | 20090009746 A | 1/2009 |
| TW | 200922208 A | 5/2009 |
| WO | WO 2009/156809 A1 | 12/2009 |
| WO | WO 2012/001224 A1 | 1/2012 |

OTHER PUBLICATIONS

International Search Report for related International Patent Application No. PCT/FI2011/050533 dated Nov. 25, 2011, pp. 1-5.

International Written Opinion for related International Patent Application No. PCT/FI2011/050533 dated Nov. 25, 2011, pp. 1-8.

Uhruski, et al., "Multi-agent Computing System in Heterogenerous Network", International Conference on Parallel Computing in Electrical Engineering 2002 (PARELEC'02) ISBN: 0-7695-1730-7/02, computer.org/portal/web/csdl/doi/10.1109/PCEE.2002.1115252.

Wolowski, et al., "Semantic Web Approach to Conent Personalization", International Conference on Mobile Ubiquitos Couputing, Systems, Services and Technologies, UBICOMM '07, Nov. 4-9, 2007, pp. 109-117, ISBN: 0-7695-2993-3.

Saravanakumar, et al., "A novel Load Balancing algorithm for computational Grid," Innovative Computing Technologies, Feb. 12-13, 2010, p. 1.

Office Action for Chinese Application No. 201180034992.4 dated Jun. 23, 2015.

European Search Report for Application No. 11 80 6352 dated Jul. 10, 2015.

Germain et al., *Concurrency Oriented Programming in Termito Scheme*, Proceedings of the 2006 Scheme and Functional Programming Workshop (2006) 125-135.

* cited by examiner

METHOD AND APPARATUS FOR DISTRIBUTING COMPUTATION CLOSURES

RELATED APPLICATIONS

This application claims the benefit of the earlier filing date under 35 U.S.C. §119(e) of U.S. Provisional Application Ser. No. 61/365,093 filed Jul. 16, 2010, entitled "Method and Apparatus for Distributing Computation Closures," the entirety of which is incorporated herein by reference.

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate webs of information with their own locally agreed semantics without necessarily conforming to an unobtainable, global whole. These information spaces, often referred to as smart spaces, are extensions of the 'Giant Global Graph' in which one can apply semantics and reasoning at a local level.

In one embodiment, information spaces are working spaces embedded with distributed infrastructures spanned around computers, information appliances, and sensors that allow people to work efficiently through access to information from computers or other devices. An information space can be rendered by the computation devices physically presented as heterogeneous networks (wired and wireless). However, despite the fact that information presented by information spaces can be distributed with different granularity, still there are challenges to achieve scalable high context information processing within heterogeneous environments such as Nokia's Mobile Clouds®. One such challenge is to create adaptive computation platforms to enhance the information processing power of a device as it interacts with various external information processors.

Some Example Embodiments

Therefore, there is a need for an approach for enabling and distributing computation closure processing to support efficient distributed computing.

According to one embodiment, a method comprises receiving a request for specifying one or more processes executing on a device for distribution over a computation space. The method also comprises causing, at least in part, serialization of the one or more processes as one or more closure primitives, the one or more closure primitives representing computation closures of the one or more processes. The method further comprises causing, at least in part, distribution of the one or more closure primitives over the computation space based, at least in part, on a cost function.

According to another embodiment, an apparatus comprising at least one processor, and at least one memory including computer program code, the at least one memory and the computer program code configured to, with the at least one processor, cause, at least in part, the apparatus to receive a request for specifying one or more processes executing on a device for distribution over a computation space. The apparatus is also caused to serialize the one or more processes as one or more closure primitives, the one or more closure primitives representing computation closures of the one or more processes. The apparatus is further caused to distribute the one or more closure primitives over the computation space based, at least in part, on a cost function.

According to another embodiment, a computer-readable storage medium carrying one or more sequences of one or more instructions which, when executed by one or more processors, cause, at least in part, an apparatus to receive a request for specifying one or more processes executing on a device for distribution over a computation space. The apparatus is also caused to serialize the one or more processes as one or more closure primitives, the one or more closure primitives representing computation closures of the one or more processes. The apparatus is further caused to distribute the one or more closure primitives over the computation space based, at least in part, on a cost function.

According to another embodiment, an apparatus comprises means for comprises receiving a request for specifying one or more processes executing on a device for distribution over a computation space. The apparatus also comprises means for causing, at least in part, serialization of the one or more processes as one or more closure primitives, the one or more closure primitives representing computation closures of the one or more processes. The apparatus further comprises means for causing, at least in part, distribution of the one or more closure primitives over the computation space based, at least in part, on a cost function.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
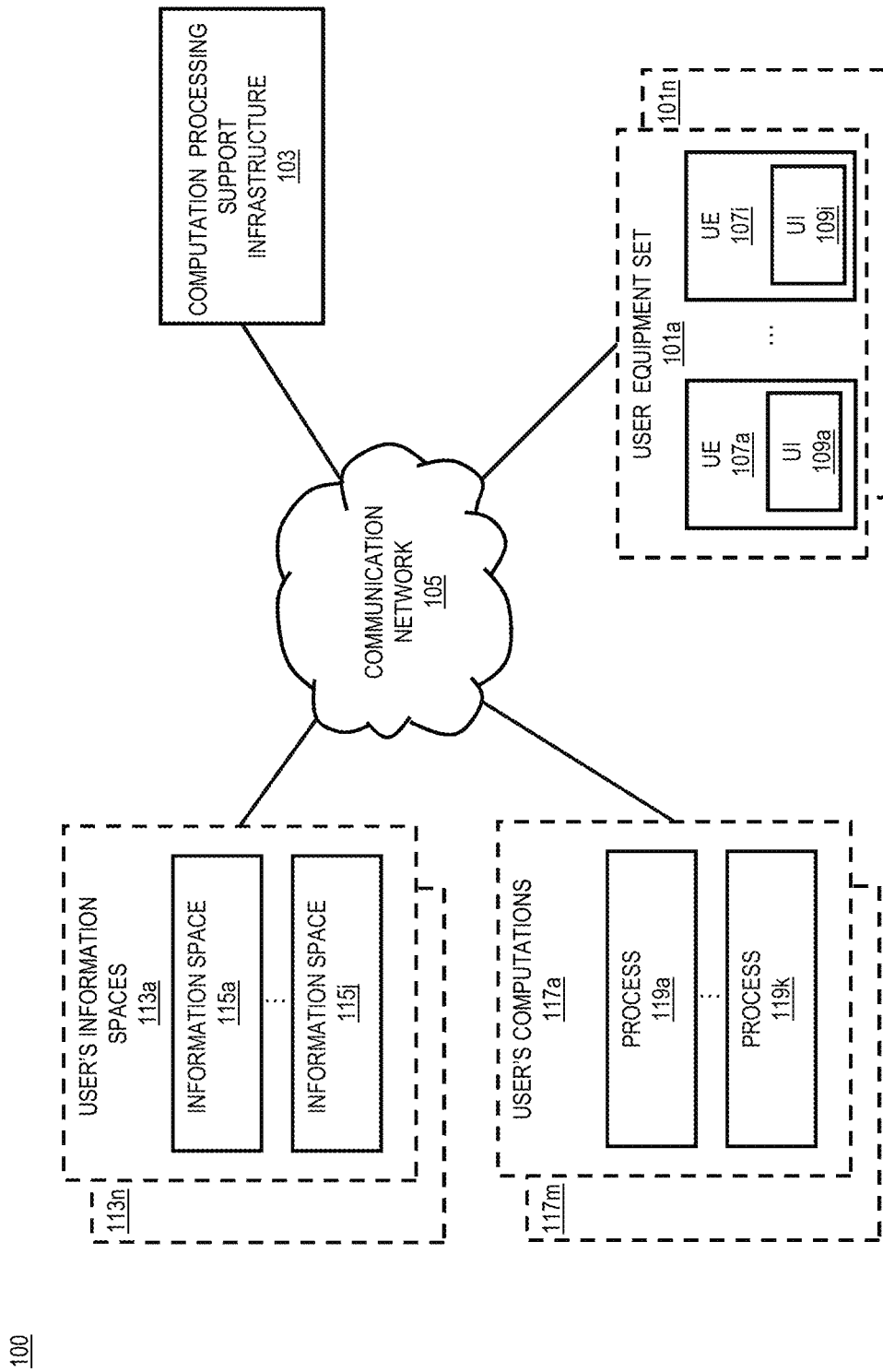
FIG. 1 is a diagram of a system capable of enabling computation closure processing to be performed for supporting distributed computing within an information or computation space, according to one embodiment.

A method, apparatus and software are provided for enabling computation closure processing to be performed for supporting distributed computing within an information or computation space. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "information space" or "smart space" refers to aggregated information sets from different sources. This multi-sourcing is very flexible since it accounts and relies on the observation that the same piece of information can come from different sources. For example, the same information (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other structures and conceptual description methods used to create models of information.

Also, as used herein, the term "reflective computing" refers to the capability of a system to reason or act upon itself. A reflective system is one that provides a representation of its own behavior which is amenable to inspection and adaptation. Reflection enables both inspection and adaptation of systems at run time. While inspection allows the current state of the system to be observed, adaptation allows the system's behavior to be altered at run time to better meet the processing needs at the time. Inevitably, reflective computing is a convenient means to enable adaptive processing to be performed respective to the contextual, environment, functional or semantic conditions present within the system at the moment; it is particularly useful for systems destined for operation within a distributed environment.

As used herein, the term "granular processing" refers to how finely a particular computational process is subdivided (e.g., a minimum unit of code that can be used to perform a task or function of the process). By way of example, granularity (e.g., a minimum level of granularity, different levels of granularity, etc.) of the processes can be defined by the developer of the process or can be dynamically determined by a system.

As used herein, the term "computation closure" identifies a particular computation procedure together with relations and communications among various processes including passing arguments, sharing process results, flow of data and process results, etc. The computation closures (e.g., a granular reflective set of instructions, data, and/or related execution context or state) provide the capability of slicing of computations for processes and transmitting the computation slices between devices, infrastructures and information spaces.

As used herein, the term "computation space" refers to an aggregated set of computation closures from different sources. In one embodiment, computations within the computation space are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. In one embodiment, an information space including aggregated computation closures is also known as a computation space.

As used herein, the term "smart space" refers to a combination of one or more information spaces and one or more computation spaces, wherein the computation spaces comprise computation closures that operate on the information in the information spaces. Although various embodiments are described with respect to information spaces, computation spaces and RDF, it is contemplated that the approach described herein may be used with other structures and conceptual description methods used to create models of information and computation.

Although various embodiments are described with respect to reflective computing or information spaces, it is contemplated that the approach described herein may be used with other computation systems and architectures as well.

FIG. 1 is a diagram of a system for enabling computation closure processing to be performed for supporting distributed computing within an information or computation space, according to one embodiment. As previously described, an information space consists of several distributed devices that communicate information (e.g. RDF graphs) via one or more Semantic Information Brokers (SIB), which contain the logic for supporting exchange of information among the distributed devices within an information or computation space. A device within an information space environment may store information locally in its own memory space or publish information to the semantic information broker. In the first case, the device is responsible for any process needed for combination or extraction of information, while in the second case the processes can be conducted by the semantic information broker. However, in many cases, the information may be organized as lists or sets of information that can include many data elements (e.g., a contact list, inventory of goods, business directory, etc.).

The basic concept of information space technology provides access to distributed information for various devices within the scope of the information space, in such a way that the distributed nature of the information is hidden from users and it appears to a user as if all the accessed information is stored on the same device. The information space also enables a user to have control over information distribution by transferring information between devices that the user has access to. For example, a user may want to transfer information among work devices, home devices, and portable devices.

Current technologies enable a user of a mobile device to manipulate contexts such as data and information via the elements of a user interface of their user equipment. However, a user does not have control over the distribution of computations and processes related to or acting on the data and information within the information space. In other words, an information space in general does not provide a user (e.g., an owner of a collection of information distributed over the information space) with the ability to control distribution of related computations and processes of, for instance, applications acting on the information. For example, a contact management application that processes contact information distributed within one or more information spaces generally executes on a single device (e.g., with all processes and computations of the application also executing on the same device) to operate on the distributed information. In some cases (e.g., when computations are complex, the data set is large, etc.), providing a means to also distribute the related computations in addition to the information space is advantageous. This advantage, is however, only beneficial to the extent that the processing load is effectively distributed across the devices or infrastructure over which the computations are to be performed.

In order to achieve this goal, a system 100 of FIG. 1 introduces the capability to construct, aggregate and distribute computations as well as their related data based in part on a cost function. More specifically, the cost function is a deterministic process for affecting how computations are distributed within the information space amongst participating devices, based at least in part, onone or more resources of the device, the computation space, one or more other devices with access to the computation space, or a combination thereof. In performing the distribution, means for enabling each computation to be deconstructed to its basic, fundamental or primitive processes or computation closures are executed. Hence, as used herein, "computation closures" refer to relations and communications among various computations, including activities such as but not limited to, passing arguments, sharing process results, data flow processing, etc. Once a computation is divided into its primitive computation closures, the processes within or represented by each closure may be executed in a distributed fashion and the processing results can be collected and aggregated into the result of the execution of the initial overall computation.

In one embodiment, each high context set of computations can be represented as closed sets of processes (e.g. transitive closures) such that closures can be executed separately (e.g. through distributed processing equipments). The transitive closures can be traversed in order to present the granular reflective processes attached to each particular execution context. The mechanism of system 100 provides distributed deductive closures as a recyclable set of pre-computed, computation closures that can be distributed among various devices and infrastructures or being shared among the users of one or more information space by being stored on any storage locations related to the information spaces. Furthermore, the mechanism provides the user with visual programming as fragments of computation, where each representation on the user interface can be bound to the computation closure it is based on. By way of example, an exemplary lambda expression as implemented via the C++ language for is provided below in Table 1. Lambda expressions are anonymous functions that can contain expressions and statements, and can be used to create delegates or expression tree types. In particular, this form of expression, though not the only means, is useful for representing a basic, functional closure definition. Lambda expressions provide for a more concise, direct functional syntax for implementing the various methods and procedures called upon respective to the computation processing request.

TABLE 1

Exemplary closure expressed as a lambda function

```
/*
this to serve as a generic/common definitions that might be used in SDK
Projec/libraries considered:
LLVM
Compiler-RT
BLCR/Xen
libdispatch
Qt (concurrency etc)
M3 (convenience lib and core)
ULS (server and R/W MM)
list can be extended
*/
namespace std {
template<class> class reference_closure; // undefined
template<class ResType , class... ArgTypes >
class reference_closure<ResType (ArgTypes ...)>
{
public:
typedef ResType result_type;
typedef T1 argument_type; // iff sizeof...(ArgTypes) == 1 and
ArgTypes contains T1
typedef T1 first_argument_type; // iff sizeof...(ArgTypes) == 2 and
ArgTypes contains T1, T2
typedef T2 second_argument_type; // iff sizeof...(ArgTypes) == 2 and
ArgTypes contains T1, T2
// trivial members:
reference_closure( ) = default;
reference_closure(const reference_closure&) = default;
reference_closure& operator=(const reference_closure&) = delete;
~reference_closure( ) = default;
// null values:
constexpr reference_closure(nullptr_t);
reference_closure& operator=(nullptr_t);
explicit operator bool( ) const;
// invocation:
ResType operator( )(ArgTypes ...) const;
};
// comparisons:
template <class ResType , class... ArgTypes >
bool operator==(const reference_closure<ResType
(ArgTypes ...)>&, nullptr_t);
template <class ResType , class... ArgTypes >
bool operator==(nullptr_t, const reference_closure<ResType
(ArgTypes ...)>&);
template <class ResType , class... ArgTypes >
bool operator!=(const reference_closure<ResType
(ArgTypes ...)>&, nullptr_t);
template <class ResType , class... ArgTypes >
bool operator!=(nullptr_t, const reference_closure<ResType
(ArgTypes ...)>&);
} // namespace std
```

As shown in FIG. 1, the system 100 comprises one or more sets 101a-101n of user equipment (UEs) UE 107a-107i, each having connectivity to a computational processing support infrastructure 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 107a-107i can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). Additionally, each UI element may be bound to a context/process by granular migration. In one embodiment, granular migration enables processes to be implicitly or explicitly migrated between devices, information spaces, and other infrastructure. The process migration can be initiated for example by means of single-cast (e.g., to just another UE 107) or multicast (e.g., to multiple other UEs 107). Still further, process migration may be triggered via gesture recognition, wherein the user preselects a particular set of UI elements and makes a gesture to simulate "pouring" the selected UE elements from one device to another.

As seen in FIG. 1, a user of UEs 107a-107i may own, use, or otherwise have access to various pieces of information distributed over a set 113a of information spaces 115a-115j. In the approach described herein, the information spaces 115a-115j may also be known as a "computation spaces" when one or more of the information spaces 115a-115j include one or more computation closures. The user can access the information via the set 101a consisting of UEs 107a-107i wherein each UE 107a-107i is equipped with one or more user interfaces (UI) 109a-109i. Furthermore, each UE 107a-107i may have access to a computation set 117a consisting of processes 119a-119k that can be used to manipulate the information stored in information spaces 115a-115j and produce results requested by the user of the UE 107.

In one embodiment, the computational processing support infrastructure 103 consists of information about computations 117a and processes 119a-119k for each UE 107a-107i. The information may include information such as input parameters, input types and formats, output types and formats, process structure, flow of data, communication means and parameter passing among processes 119a-119k, etc. The computation information enables a UE 107a-107i to divide computations into their primary computation closures, wherein each computation closure can be executed separately from other computation closures belonging to the same computation. For example, computations related to a music download may be divided into a search process for finding the most suitable download site, a verification process to determine whether the user is eligible for downloading from the site, an initialization process for verifying adequate resource (e.g. storage space) for the file to be downloaded, a process for verifying the type of the music file and associated playing environment, a process for determining whether the player is available on the UE 107, a process to activate the player after completion of the download, etc. In one embodiment, these processes or the computation closures derived from the processes may be executed independently from each other, i.e., by different devices, backend servers, etc. of the information space infrastructure. A cost function is executed to determine how the processes will be distributed based on, for example, network, resource or computing device processing capacity relative to the computation needs. Following execution of the independent processes, the data and parameters resulting from the execution can be exchanged to be able to aggregate results and make operation of the music application available in an information space environment. Moreover, division of the music-related computations into independent processes may vary based on factors such characteristics of the UE, restrictions of the download site, the music file type, the player type and requirements, etc. In one embodiment, division of computations into their primary processes or computation closures is managed by the computational processing support infrastructure 103. In addition, when the computation closures are serialized into, for instance, an information syntax such as RDF triples and stored via an information space, the information space incorporating the serialized computation closures are also known as a computation space.

By way of example, the UEs 107a-107i of sets 101a-101n, computational processing support infrastructure 103, and the information spaces 113a-113n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
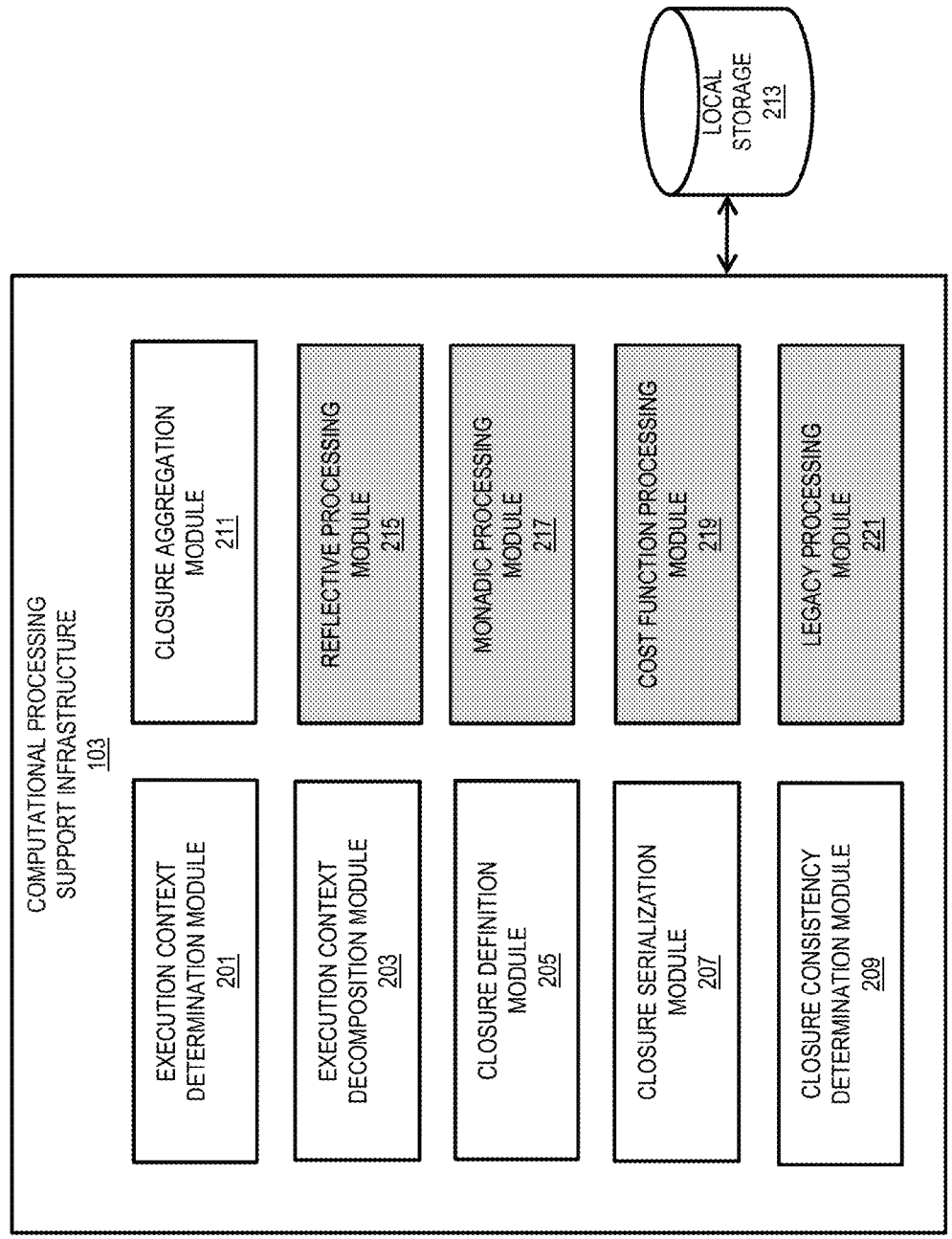
FIG. 2 is a diagram of the components of a computational processing support infrastructure, according to one embodiment.

FIG. 2 is a diagram of the components of the distributed computational processing support infrastructure, according to one embodiment. By way of example, the computational processing support infrastructure 103 includes one or more components for construction and aggregation of distributed computations. Furthermore, the computational processing support infrastructure 103 is configured to relay computation based processes based on cost function considerations, while also enabling legacy devices to be properly accounted for within the information space. It is contemplated that the functions of these components may be combined in one or more components or performed by other components of equivalent functionality. In this embodiment, the computational processing support infrastructure includes an execution context determination module 201, an execution context decomposition module 203, a closure definition module 205, a closure serialization module 207, a closure consistency determination module 209, and a closure aggregation module 211, a reflective processing module 215, a monadic processing module 217, a cost function processing module 219 and a legacy processing module 221.

The computational processing support infrastructure 103 receives a request for computation distribution. In one embodiment, the request may have been generated by a UE 107 based on a user gesture such as for example pushing an icon of the UI 109 towards another UE 107 which may indicate that the user wants the process associated with the icon to be executed in the other UE 107. In another embodiment, the request for computation distribution may be generated by a component of an information space linked to the UE 107, by an independent component having connectivity to the UEs 107 and the information spaces via the communication network 105, or a combination thereof.

The request for computation distribution may include information about the computation that is going to be distributed, including input, output, processing requirements, etc. The request may also include information about the origin and the destination of a computation. For example, a user may want to distribute the computations associated with encoding a video file from one format to another (a typically highly processor and resource intensive task). In this example, the video file is stored in the user's information space 115 or otherwise available over the communication network 105 (e.g., downloaded from a source over the Internet), and therefore accessible from the UEs 107. Accordingly, the user may make a manual request to distribute the computations associated with the video encoding to one or more other devices, a backend server, cloud computing components and/or any other component capable of performing at least a portion of the encoding functions. By way of example, the manual request may be made via a graphical user interface by dragging an icon or other depiction of the computations to command areas depicted in the user interface. These command areas, for instance, may be representative of physical or virtual locations of the other UEs 107 or devices that can support or perform the distributed computations. In other cases, the distribution can be initiated automatically by the system 100 based on one or more criteria via a request generator (not shown) in conjunction with the computational processing support infrastructure 103.

In one embodiment, following the receipt of the computation distribution request, the execution context determination module 201 retrieves and analyzes the information regarding the computation and determines the execution components involved in the computation. For the above example (encoding a video file from one format to another), the execution context may include video playing, audio playing, codec formatting, etc. and related settings, parameters, memory states, etc. The identified execution context may be stored in a local storage 213, in a storage space associated with the information space 113a-113n, sent directly to the execution content decomposition module 203 or a combination thereof.

In another embodiment, the execution context decomposition module 203 breaks each execution context into its primitive or basic building blocks (e.g., primitive computation closures) or the sub-processes of the whole execution context. For example, the video playing execution may be decomposed into computations or processes that support tasks such as, searching for available players, check the compatibility of video file with the players found, select the player, activate the selected player, etc. Each of the decomposed sub-processes may have certain specifications and requirements to effect execution of the processes in an information space 115 or computation space such as input and output medium and type, how parameters or results are to be passed to other processes, runtime environments, etc. In order for a process to be executed in a standalone fashion without being part of a larger process, a computation closure can be generated for the process. A computation closure includes the process and the specifications and requirements associated with the process that can be executed independently for subsequent aggregation.

In one embodiment, the closure definition module 205 generates computation closures for the sub-processes extracted by the execution context decomposition module 203 and stores the closures in the database 213. The stored closures may be used for slicing computations into smaller independent processes to be executed by various available UEs 107a-107i, using the data which may be stored on the distributed information spaces 115a-115j. Operating in connection with the closure definition module 205, closure serialization module 207 utilizes the defined closures of module 205 and produces the serialized granular computation elements. The closure serialization process as performed by module 207 can also perform data marshalling as is necessary for ensuring data format consistency within a distributed environment. Pursuant to the serialization process, the processing state of each closure is also encoded and stored in the computation space.

In one embodiment, the closure serialization may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
| --- | --- | --- |
| uri://....../rule#CD-introduction, | rdf:type, | uri://............/Rule |
| uri://....../rule#CD-introduction, | uri://....../rule#assumption, | "c" |

The granularity may be achieved by the basic format of operation (e.g. RDF) within the specific computing environment. Furthermore, the reflectivity of processes (i.e. the capability of processes to provide a representation of their own behavior to be used for inspection and/or adaptation) may be achieved by encoding the behavior of the computation in RDF format. Additionally, the context may be assumed to be partly predetermined and stored as RDF in the information space and partly be extracted from the execution environment. It is noted that the RDF structures can be seen as subgraphs, RDF molecules (i.e., the building block of RDF graphs) or named graphs in the semantic information broker (SIB) of information spaces.

In certain embodiments serializing the closures associated with a certain execution context enables the closures to be freely distributed among multiple UEs 107 and/or devices, including remote processors associated with the UEs 107 by one or more user information spaces 113a-113n via the communication network 105. The processes of closure assigning and migration to run-time environments may be performed based on a cost function as executed by a cost function processing module 219, which accepts as input variables for a cost determination algorithm those environmental or procedural factors that impact optimal processing capability from the perspective of the multiple UEs, remote processors associated therewith, information space capacity, etc. Such factors may include, but are not limited to, the required processing power for each process, system load, capabilities of the available run-time environments, processing required to be performed, load balancing considerations, security considerations, etc. As such, the cost function is, at least in part, an algorithmic or procedural execution for evaluating, weighing or determining the requisite operational gains achieved and/or cost expended as a result of the differing closure assignment and migration possibilities. Objectively, the assignment and migration process is to be performed (e.g., by the cost function processing module 219 or a distribution module (e.g., not shown)) in light of that which presents the least cost relative to present environmental or functional conditions.

Following the migration of each computation closure to its designated run-time environment, the run-time environment may communicate with the computational processing support infrastructure 103 regarding the receipt of the closures through components referred to as agents. Upon receiving the communication from an agent, closure consistency determination module 209 verifies the consistency of the closures which, as explained before, are in RDF graph format. The consistency verification ensures that the computation closure content for each closure is accurate, contains all the necessary information for execution, the flow of data and instructions is correct according to the original computation and has not been damaged during the serialization and migration process. If the closures pass the consistency check or is otherwise approved, closure aggregation module 211 reconstructs each component of the execution context based on the content of the computation closures. Once an execution context is reconstructed, the agents of the run-time environment can resume the execution of the execution context component that it initially received as computation closures in RDF format. In one embodiment, the resumption of the execution may be combined with one or more other results of other executions of at least a portion of the execution context.

In one embodiment, the execution of a reflective processing module 215 allows the execution context as aggregated by module 211 to be modified dynamically as engaged by the run-time environment. In effect, the reflective processing module 215 monitors and then modifies the execution structure and/or behavior at run-time, such as in response to perceived metadata as encoded within the computation structures as aggregated or other predetermined response data (framework data, relational mapping, object relevancy data for taking advantage of generic code executions, etc.). As such, the reflective processing module 215 tailors the execution to meet specific processing goals. For example, a video data execution intended to be rendered in one format may be adapted at run-time to meet new format requirements. Operating in connection with the closure definition module 205, in accord with one embodiment, the monadic processing module 217 enables computation closures to be encoded with specific functional data types based on processing rules that allow them to be chained together, such as to sequence the computational processing or regulate the control flow of computational processing.

In one embodiment, the legacy processing module 221 encodes or wraps computation closures with data types corresponding to legacy application or device specifications in response to the presence of a legacy device within distributed computing environment. The legacy processing module 221 maintains one or more legacy library definition data sets, such as maintained in storage 213 then accesses the required definitions in response to a determination that a computational processing request originated from a legacy device or application. At various levels of abstraction, the closures primitives of which a closure is constructed is wrapped, or in some executions, replaced with the appropriate legacy definitions and data types based, at least in part, on the determination.

Figure 3:
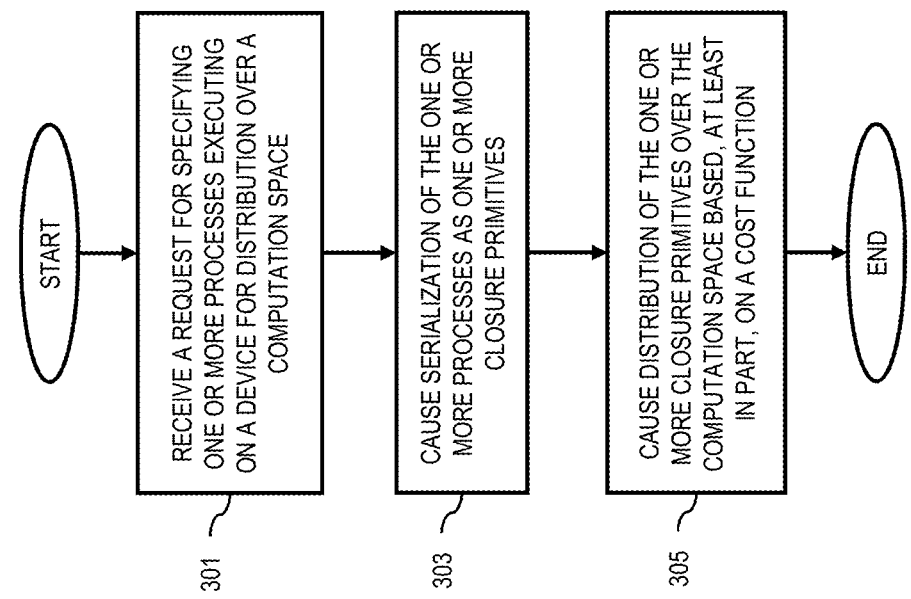
FIG. 3 is a flowchart of a process for enabling computation closure processing to be performed for supporting distributed computing within an information or computation space, according to one embodiment.

FIG. 3 is a flowchart of a process 300 for enabling computation closure processing to be performed for supporting distributed computing within an information space, according to one embodiment. In a first step 301, the computational processing support infrastructure 103 receives a request, such as initiated by a user device, specifying one or more processes executing on said device for distribution over a computation space. Once the processes are contextually processed and defined by modules 201-205 of the computational processing support infrastructure, in a next step 303, the processes are serialized into one or more representative closure primitives by the closure serialization module 207. In this way, the various processes are prepared for distribution in as discrete a computational form as possible. As yet another step 305, having been serialized, the one or more closure primitives are distributed to respective one or more other devices, processors, etc. of the computation space based, at least in part, on a cost function as executed by the cost function processing module 219.

Figure 4:
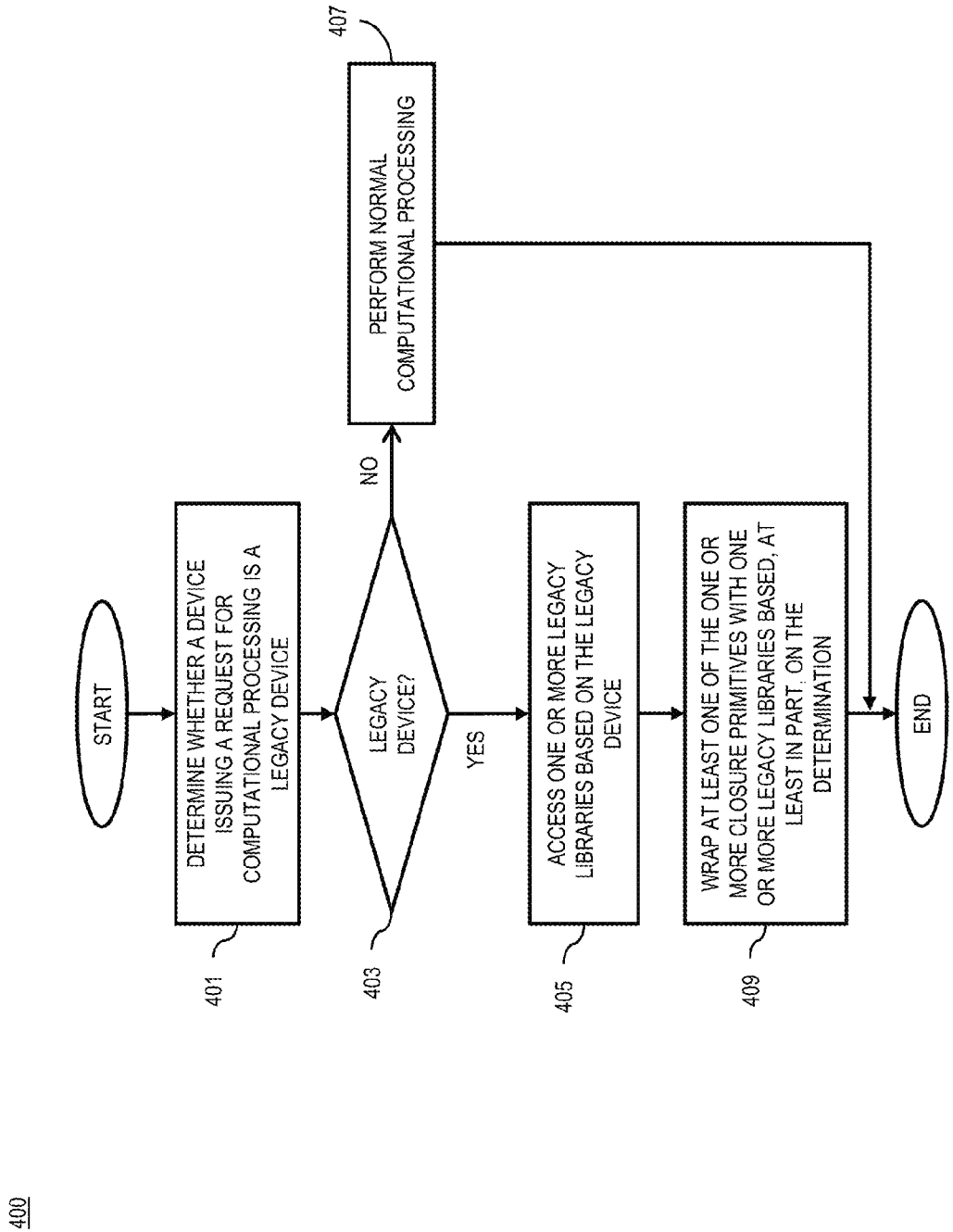
FIG. 4 is a flowchart of a process for enabling computation closure processing to be performed with legacy devices for supporting distributed computing within an information or computation space, according to one embodiment.

FIG. 4 is a flowchart of a process for enabling computation closure processing to be performed with legacy devices for supporting distributed computing within an information or computation space, according to various embodiments. As used herein, a legacy device (i.e., including an application or self contained executable) pertains to any system whose behavior or implementation, while still functional within a given operating environment, is outdated by current technological standards. Generally, legacy devices include application procedures (APIs), operating system (OS) terminologies or other functional modalities that are not readily acceptable or relevant to the information and/or computation space infrastructure. Process 400 of FIG. 4 overcomes this challenge so as to ensure the viability of computational processing within an information space comprising one or more legacy devices.

As a first step 401, a device issuing a request for computational processing (e.g., processing of computation closures or one or more processes thereof) is determined to be a legacy device. The determination may be based on analysis 403 of a data code, error code, process flag, metadata value or some other variable as presented by way of the request to the computational processing support infrastructure 103. As a next step 407, when the device is determined to be an up-to-date model, traditional computational processing such as that presented with respect to FIG. 3, is performed. Alternatively, when the result of the analysis 403 is that the device is a legacy device 403, the legacy processing module 221 accesses one or more legacy libraries corresponding to the identified legacy device. So, for example, if the operating system (OS) corresponding to the legacy device is determined to be a decidedly primitive/earlier, albeit functional OS, the library definitions and specifications corresponding to this OS are retrieved. As yet another step 409, the one or more closure primitives corresponding to the legacy device are wrapped with one or more code structures or data formats for enabling effective interaction between the legacy device and the computation space infrastructure.

Figure 5:
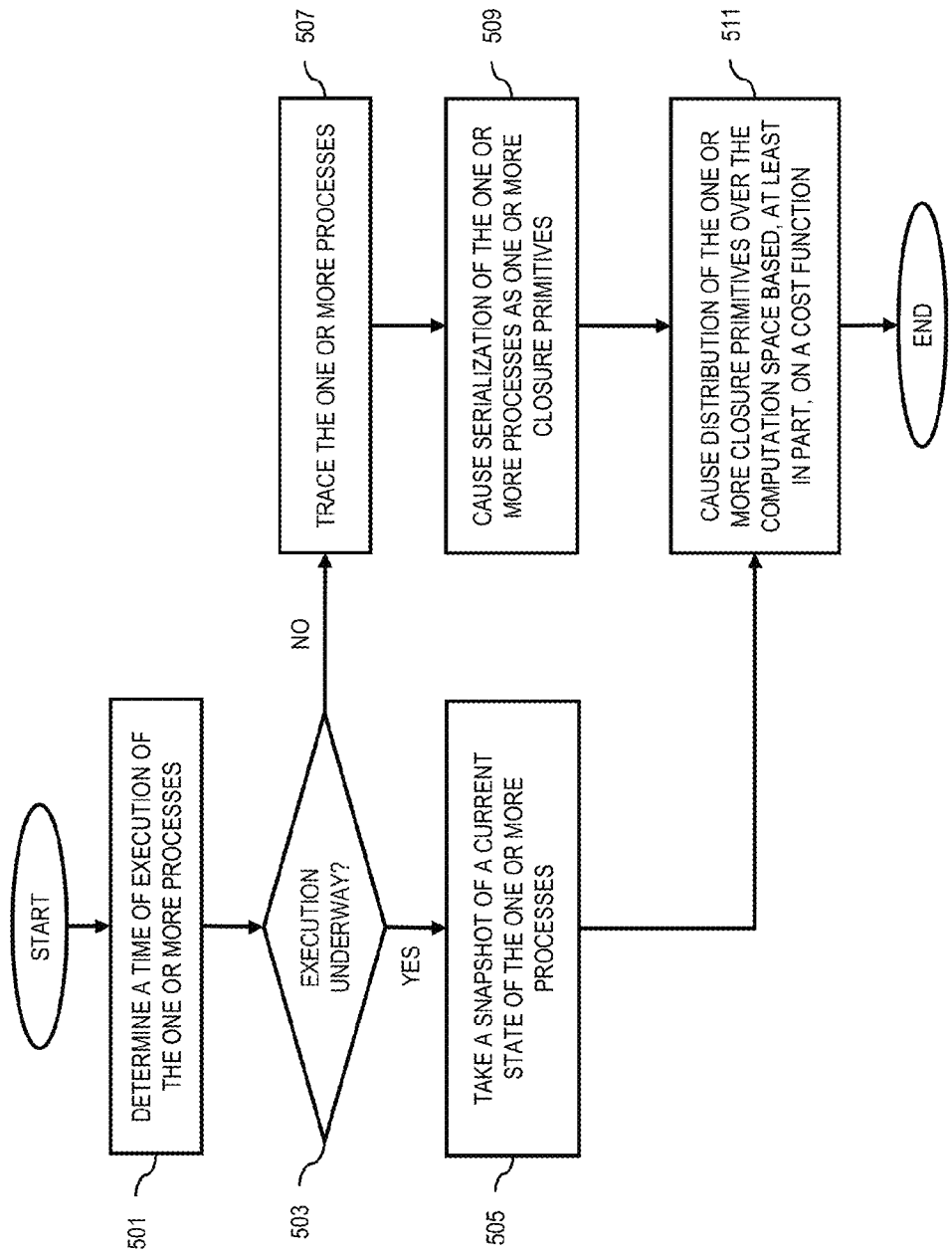
FIG. 5 is a flowchart of a process for accounting for different points of execution of one or more processes for supporting distributed computing within an information or computation space, according to one embodiment.

FIG. 5 is a flowchart of a process for accounting for different points of execution of one or more processes for supporting distributed computing within an information space, according to one embodiment. In particular, optimal distribution of closure primitives is best sustained in light of the current or original state of execution of the one or more processes associated with a request. Processing resources—i.e., devices, backend systems, servers—can be utilized (e.g., assigned and migrated) respective to the scheme employed by the cost function processing module 219 relative to the execution states.

In a first step 501, a time of execution of the one or more processes requested for execution on a device is determined. Depending on the contextual nature of the computation operation to be performed, the processes and subprocesses thereof would be performed in varying order, and hence represent different times of execution. This information may be tagged (e.g., as metadata) respective to the processing result. As a next step 503, when the execution time is determined to be already underway or has elapsed to with a specific threshold—i.e., primary computation closure operations have already been serialized—a snapshot of a current state of the one or more processes is taken. The snapshot, as performed with respect to step 505, corresponds to a capture of present data structure forms, procedural elements, current state data, execution sequence information and other relevant transformation processing data available at the moment of capture. Upon capture, this information is then maintained in a temporary data store 213 of computational processing support infrastructure 103.

In particular, this data is now made available to at least the cost function processing module 219, wherein the scheme employed by the module for evaluating the benefits and/or costs of varying closure primitive assignment and migration patterns can also account for the known execution states. It is noted that the distribution step 511, which is based at least in part on the cost function, may be further optimized based on known executions states. So, for example, the present execution state of one or more already engaged processes may be used to optimize distribution of a large scale computational processing task that can be better processed by a newly introduced backend server to the information space rather than the current small scale laptop processing it at the moment. Or, as another example, the execution state information can be used in connection with the cost function to drive the distribution of closure primitives from a device that experiences a power shutdown to one that is active. Indeed, any environmental, functional or infrastructural conditions can be further adapted to and accounted for in light of known processing state conditions.

With reference still to FIG. 5, when it is determined that no execution has yet transpired or no active (new) execution states are underway, step 507 entails the tracing back of the one or more processes to the device associated with the initial distribution request (step 301 of FIG. 3). As next steps 509 and 511 respectively, the one or more traced back processes are serialized and distributed accordingly. Steps 507-511 correspond primarily to the prior described execution as presented with respect to various embodiments, wherein the originating sources of the request must be accounted for to enable proper return of computation results upon aggregation of respective closure primitives.

Figure 6:
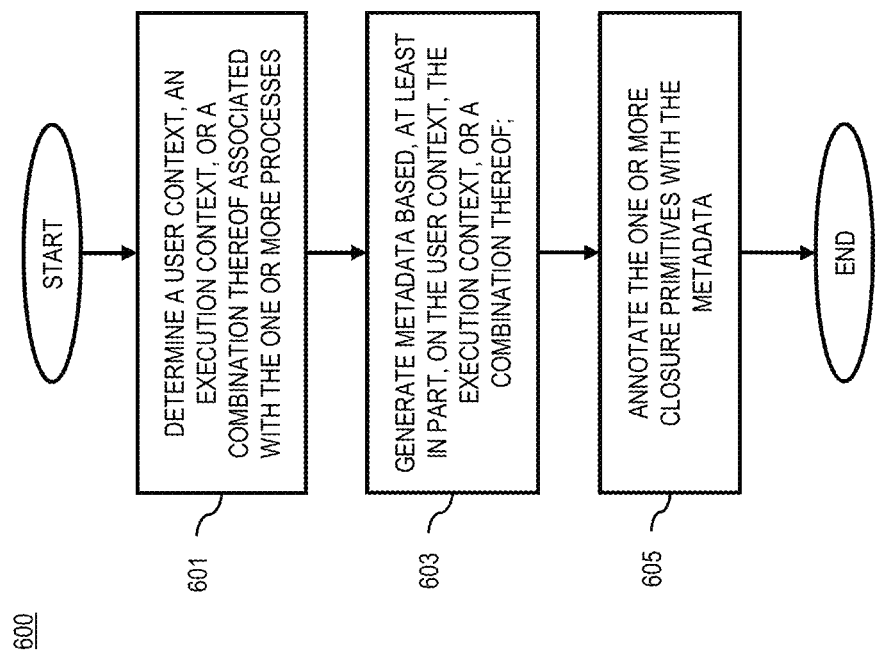
FIG. 6 is a flowchart of a process for generating metadata associated with one or more processes for supporting distributed computing within an information or computation space, according to one embodiment.

FIG. 6 is a flowchart of a process for generating metadata associated with one or more processes for supporting distributed computing within an information or computation space, according to one embodiment. As mentioned previously, the metadata is useful for providing contextual details pertaining to the one or more processes requesting execution. With respect to the computational processing support infrastructure 103, process 600 as presented pertains to execution of one or a combination of the execution context determination module 201 and the execution context decomposition module 203.

As a first step 601, a user context, execution context or combination thereof associated with the one or more processes requested for distribution is determined. In some instances, an environmental context, infrastructure context, network context or even device context may also be determined when required, so as to enable further computational processing by the computational processing support infrastructure 103. As a next step 603, metadata is generated based on the determined contextual data. As yet another step 605, the one or more closure primitives are annotated/tagged/encapsulated with the metadata. It is noted that, among other things, the context data may appropriately support transitive closure processing, reflective processing execution, monadic processing execution and legacy device handling execution.

Figure 7:
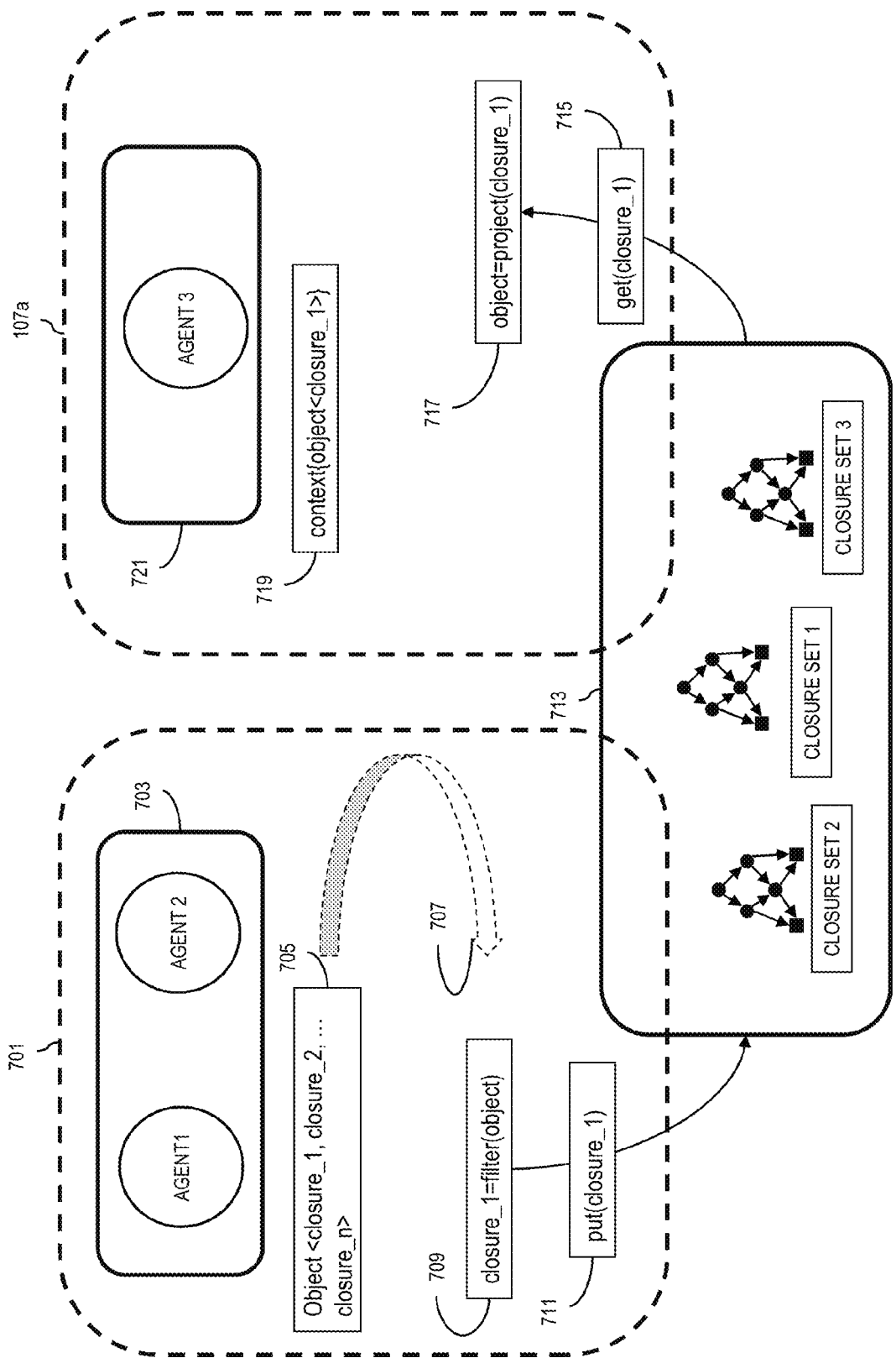
FIG. 7 is a diagram of process migration from a device to another device, according to one embodiment.

FIG. 7 is a diagram of process migration from a device to another device, according to one embodiment. In one embodiment, a backend device 701 may be one or many virtual run-time environments within the user's information spaces 113*a*-113*n* or on one UE 107 associated with the user. The backend device 701 may include a user context 703 for every user equipment 107*a*-107*i* connected to the backend device 701. The user context 703 may be a copy of the user context 821 for each device 107*a* which is being migrated among devices. Agent1 and agent2 are processors that calculate and handle computation closures within the user context 703. The number of agents may be different in different devices based on their design, functionality, processing power, etc. Block 705 represents an Object as a set of computation closures, closure_1, closure_2, . . . , and closure_n, where each closure is a component of a larger process, for example, related to a service provided to the user by the user equipment 107*a*. The closures may be generated by the closure definition module 205 of the computational processing support infrastructure 103 and each closure is a standalone process that can be executed independently from the other closures. In the example of FIG. 7, the filtering process 707 extracts closure_1 from the closure set Object via filtering the set (shown in block 709) by the execution context decomposition module 203. The extracted closure_1 is added to a computation closure store 713 using the exemplary Put command 811.

In keeping with this example, assuming that the extracted computation closure, closure_1 is supposed to be executed on the user equipment 107*a*, the user equipment 107*a* extracts the computation closure closure_1 from the computation closure store 713 using the Get command 715. In one embodiment, the decision of the equipment on which a computation closure is to be migrated for computation is determined, at least in part, by a cost function processing module 219. The migrated closure_1 is projected into a closure with the user device context (process states) and the object 717 is produced. The block 719 represents the reconstruction of the closure into the initial context by the closure aggregation module 211. The aggregated context may then be executed in the run-time environment 721 of UE 107*b* by Agent3. Additional run-time executions may be invoked by the reflective processing module 215 if necessary, responsive to specific processing goals or environmental or infrastructural changes.

In another embodiment, the block 703 may be a user equipment and block 721*a* backend device or both blocks 701 and 721 may be UEs. In this embodiment the decomposition and aggregation processes are similar to the above example with the difference that closure_1 is extracted from a process on the UE 801. Still further, one or more of blocks 701 and 721 may represent legacy UEs, wherein the legacy processing module 221 is effectively employed to enable their operation over the information or computation space.

It is noted that prior to serialization of the computation closures by the closure serialization module 207, computational processing support infrastructure 103 supports those functions required of an information space. Upon serialization of the computation closures (i.e., as one or more closure primitives), however, the computational processing support infrastructure 103 supports those functions required of a computation space. As such, both information space and computation space processing can be accommodated, with distribution for computation purposes being facilitated based, at least on cost function considerations.

The processes described herein for enabling computation closure processing to be performed for supporting distributed computing within an information space may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
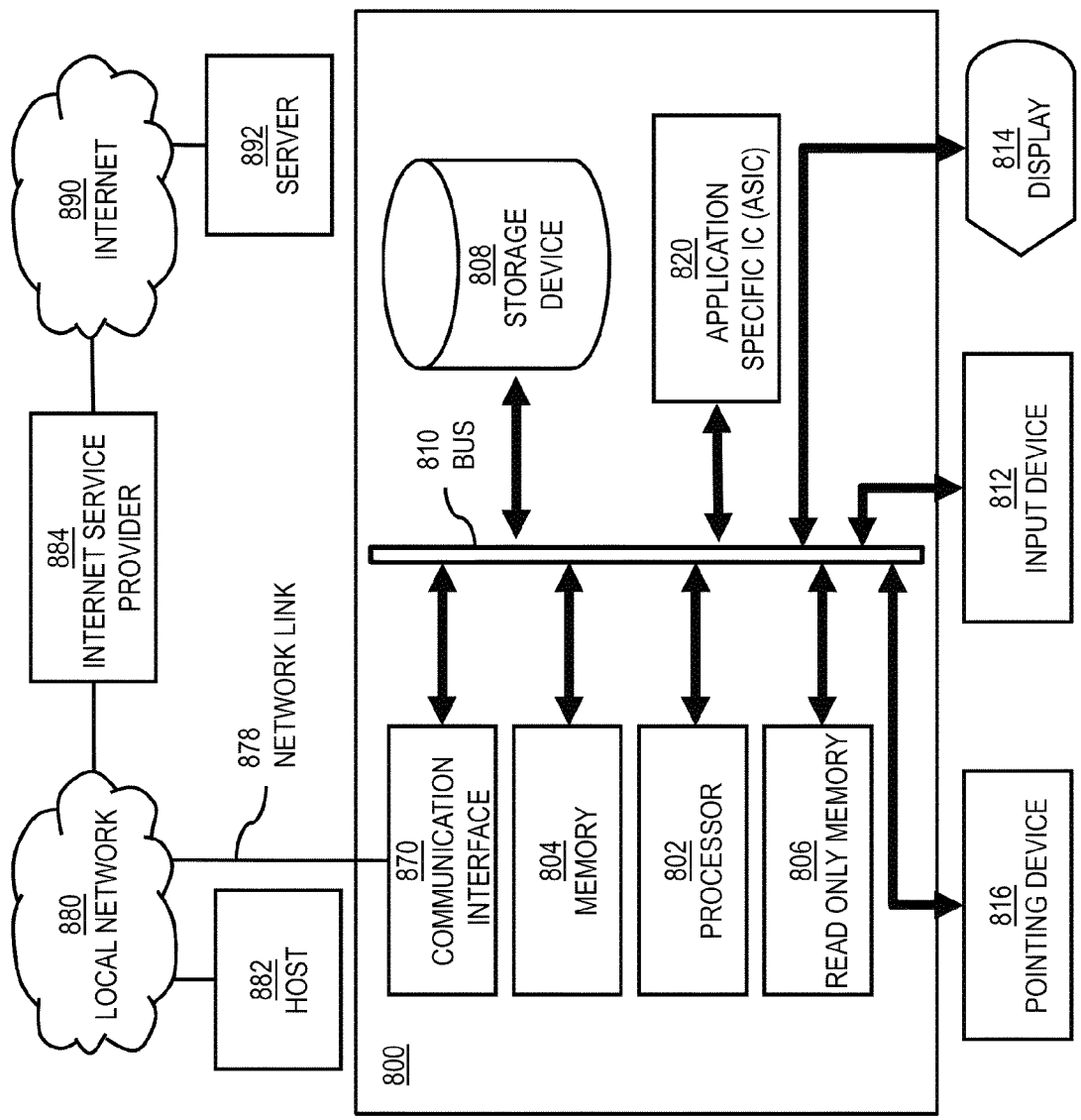
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to enable computation closure processing to be performed for supporting distributed computing within an information space as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of enabling computation closure processing to be performed for supporting distributed computing within an information space.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to enabling computation closure processing to be performed for supporting distributed computing within an information space. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for enabling computation closure processing to be performed for supporting distributed computing within an information space. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for enabling computation closure processing to be performed for supporting distributed computing within an information space, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for enabling computation closure processing to be performed for supporting distributed computing within an information space to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
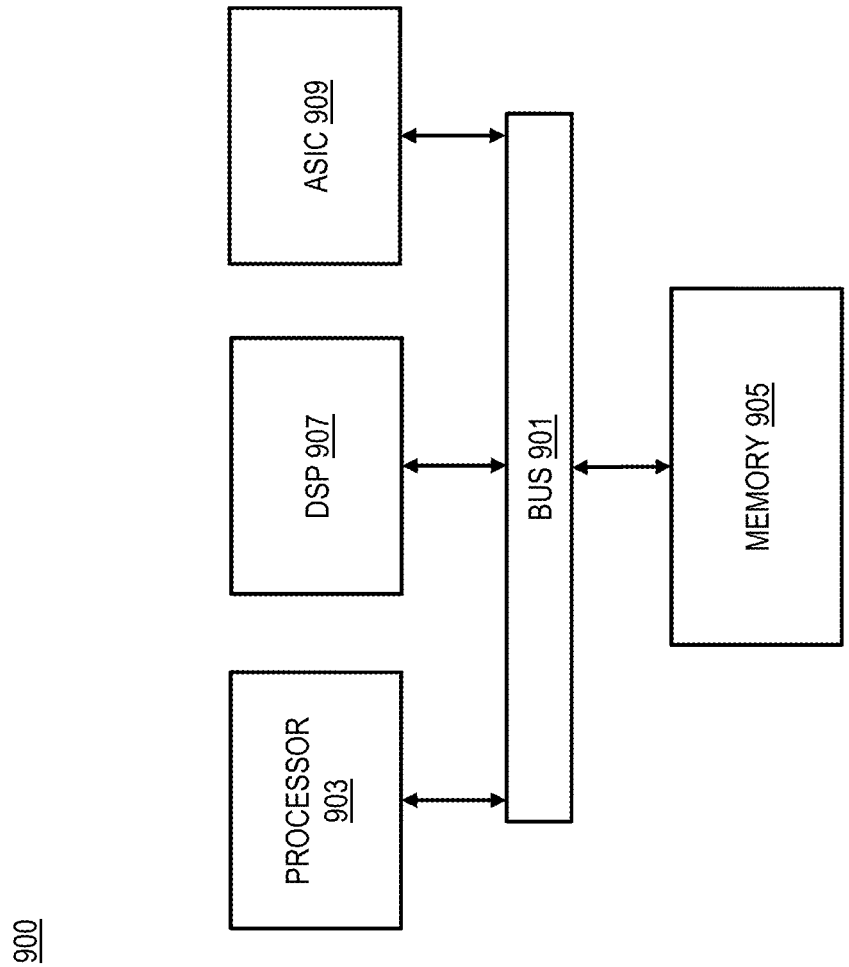
FIG. 9 is a diagram of a chip set that can be used to implement an embodiment of the invention.

FIG. 9 illustrates a chip set or chip 900 upon which an embodiment of the invention may be implemented. Chip set 900 is programmed to enable computation closure processing to be performed for supporting distributed computing within an information space as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of services. Chip set or chip 900, or a portion thereof, constitutes a means for performing one or more steps of enabling computation closure processing to be performed for supporting distributed computing within an information space.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable computation closure processing to be performed for supporting distributed computing within an information space. The memory 905 also stores the data associated with or generated by the execution of the inventive steps.

Figure 10:
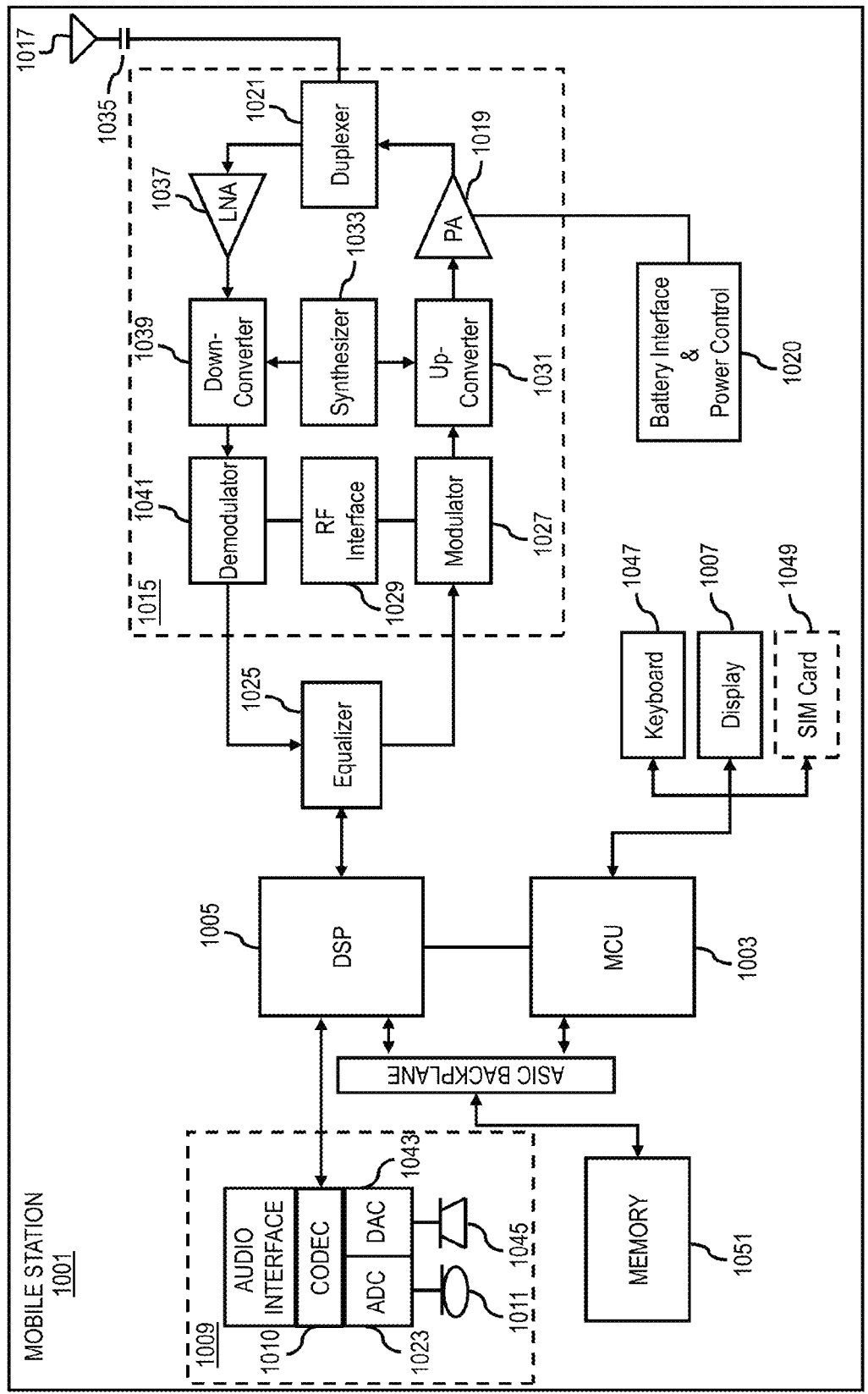
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of enabling computation closure processing to be performed for supporting distributed computing within an information space. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of enabling computation closure processing to be performed for supporting distributed computing within an information space. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to enable computation closure processing to be performed for supporting distributed computing within an information space. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request for specifying one or more processes executing on a device for distribution over a computation space;
   causing, at least in part, serialization of the one or more processes as one or more closure primitives, the one or more closure primitives representing computation closures of the one or more processes;
   causing, at least in part, distribution of the one or more closure primitives over the computation space based, at least in part, on a cost function;
   verifying a consistency of the one or more closure primitives based, at least in part, on one or more communications from agents of one or more run-time environments in the computation space; and
   upon verification of the consistency, reconstructing an execution context associated with the one or more processes and resuming execution of the one or more closure primitives representing computation closures of the one or more processes.

2. A method of claim 1, wherein the cost function is based, at least in part, on one or more resources of the device, the computation space, one or more other devices with access to the computation space, or a combination thereof.

3. A method of claim 2, wherein the one or more resources include power reserves, processing power, memory size, bandwidth, or a combination thereof.

4. A method of claim 2, further comprising:
   causing, at least in part, optimization of the cost function with respect to scalability, load-balancing, or a combination thereof.

5. A method of claim 1, further comprising:
   determining whether the device is a legacy device; and
   causing, at least in part, wrapping of at least one of the one or more closure primitives with one or more legacy libraries based, at least in part, on the determination.

6. A method of claim 1, further comprising:
   determining a time of execution of the one or more processes; and
   causing, at least in part, tracing of the one or more processes, taking a snapshot of a current state of the one or more processes,
   wherein the serialization of the one or more closure primitives is further based, at least in part, on the tracing, the snapshot, or a combination thereof.

7. A method of claim 1, further comprising:
   determining a user context, an execution context, or a combination thereof associated with the one or more processes;
   generating metadata based, at least in part, on the user context, the execution context, or a combination thereof; and
   causing, at least in part, annotation of the one or more closure primitives with the metadata.

8. A method of claim 1,
   wherein reconstructing the execution context comprises reconstructing the execution context associated with the one or more processes based, at least in part, on a content of the one or more computation closures, and
   wherein the computation space comprises the device, one or more other devices, one or more servers, or a combination thereof, and wherein all or a portion of the one or more closures primitives are distributed to the device, the one or more other devices, the one or more servers, of a combination thereof for the reconstruction.

9. A method of claim 1, further comprising:
   retrieving one or more lambda expressions corresponding to the one or more processes, the one or more lambda expressions defining one or more anonymous functions corresponding to the one or more processes,
   wherein the one or more closure primitives are based, at least in part, on the one or more lambda expressions.

10. A method of claim 1, wherein the cost function is based on an execution state of the one or more processes associated with the request, and a cost evaluation of varying one or more closure primitive assignment and migration patterns of the one or more closure primitives.

11. An apparatus comprising:
    at least one processor; and
    at least one memory including computer program code for one or more programs,
    the at least one memory and the computer program code configured to, with the at least one processor, cause the apparatus to perform at least the following,
    receive a request for specifying one or more processes executing on a device for distribution over a computation space;
    cause, at least in part, serialization of the one or more processes as one or more closure primitives, the one or more closure primitives representing computation closures of the one or more processes;
    cause, at least in part, distribution of the one or more closure primitives over the computation space based, at least in part, on a cost function;
    verify a consistency of the one or more closure primitives based, at least in part, on one or more communications from agents of one or more run-time environments in the computation space; and
    upon verification of the consistency, reconstruct an execution context associated with the one or more processes and resume execution of the one or more closure primitives representing computation closures of the one or more processes.

12. An apparatus of claim 11, wherein the cost function is based, at least in part, on one or more resources of the device, the computation space, one or more other devices with access to the computation space, or a combination thereof.

13. An apparatus of claim 12, wherein the one or more resources include power reserves, processing power, memory size, bandwidth, or a combination thereof.

14. An apparatus of claim 12, wherein the apparatus is further caused to:
    cause, at least in part, optimization of the cost function with respect to scalability, load-balancing, or a combination thereof.

15. An apparatus of claim 11, wherein the apparatus is further caused to:
- determine whether the device is a legacy device; and
- cause, at least in part, wrapping of at least one of the one or more closure primitives with one or more legacy libraries based, at least in part, on the determination.

16. An apparatus of claim 11, wherein the apparatus is further caused to:
- determine a time of execution of the one or more processes; and
- cause, at least in part, tracing of the one or more processes, taking a snapshot of a current state of the one or more processes,
- wherein the serialization of the one or more closure primitives is further based, at least in part, on the tracing, the snapshot, or a combination thereof.

17. An apparatus of claim 11, wherein the apparatus is further caused to:
- determine a user context, an execution context, or a combination thereof associated with the one or more processes;
- generate metadata based, at least in part, on the user context, the execution context, or a combination thereof; and
- cause, at least in part, annotation of the one or more closure primitives with the metadata.

18. An apparatus of claim 11, wherein the apparatus is further caused to:
- Reconstruct the execution context by reconstructing the execution context associated with the one or more processes based, at least in part, on a content of the one or more computation closures,
- wherein the computation space comprises the device, one or more other devices, one or more servers, or a combination thereof, and wherein all or a portion of the one or more closures primitives are distributed to the device, the one or more other devices, the one or more servers, of a combination thereof for the reconstruction.

19. An apparatus of claim 11, wherein the apparatus is further caused to:
- retrieve one or more lambda expressions corresponding to the one or more processes, the one or more lambda expressions defining one or more anonymous functions corresponding to the one or more processes,
- wherein the one or more closure primitives are based, at least in part, on the one or more lambda expressions.

20. An apparatus of claim 11, wherein the cost function is based on an execution state of the one or more processes associated with the request, and a cost evaluation of varying one or more closure primitive assignment and migration patterns of the one or more closure primitives.

21. A non-transitory computer-readable storage medium carrying one or more sequences of one or more instructions which, when executed by one or more processors, cause an apparatus to at least perform the following steps:
- receiving a request for specifying one or more processes executing on a device for distribution over a computation space;
- causing, at least in part, serialization of the one or more processes as one or more closure primitives, the one or more closure primitives representing computation closures of the one or more processes;
- causing, at least in part, distribution of the one or more closure primitives over the computation space based, at least in part, on a cost function;
- verifying a consistency of the one or more closure primitives based, at least in part, on one or more communications from agents of one or more run-time environments in the computation space; and
- upon verification of the consistency, reconstructing an execution context associated with the one or more processes and resuming execution of the one or more closure primitives representing computation closures of the one or more processes.

22. A non-transitory computer-readable storage medium of claim 21, further comprising:
- reconstructing the execution context by reconstructing the execution context associated with the one or more processes based, at least in part, on a content of the one or more computation closures,
- wherein the cost function is based, at least in part, on one or more resources of the device, the computation space, one or more other devices with access to the computation space, or a combination thereof.

23. A non-transitory computer-readable storage medium of claim 21, wherein the cost function is based on an execution state of the one or more processes associated with the request, and a cost evaluation of varying one or more closure primitive assignment and migration patterns of the one or more closure primitives.

* * * * *